United States Patent
Ohno et al.

(10) Patent No.: US 9,858,293 B2
(45) Date of Patent: Jan. 2, 2018

(54) IMAGE PROCESSING APPARATUS AND IMAGE PROCESSING METHOD

(71) Applicant: CANON KABUSHIKI KAISHA, Tokyo (JP)

(72) Inventors: Akira Ohno, Tokyo (JP); Yoshinori Ito, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/669,456

(22) Filed: Mar. 26, 2015

(65) Prior Publication Data
US 2015/0286892 A1  Oct. 8, 2015

(30) Foreign Application Priority Data
Apr. 3, 2014 (JP) ................. 2014-077247

(51) Int. Cl.
G06F 17/30    (2006.01)
G06K 9/46     (2006.01)
G06T 5/40     (2006.01)

(52) U.S. Cl.
CPC ..... *G06F 17/30247* (2013.01); *G06K 9/4642* (2013.01); *G06K 9/4647* (2013.01); *G06T 5/40* (2013.01); *G06K 2009/4666* (2013.01)

(58) Field of Classification Search
CPC ............ G06F 17/30247; G06K 9/4647; G06K 2009/4666
See application file for complete search history.

(56) References Cited

FOREIGN PATENT DOCUMENTS

| JP | 06-036028 A | 2/1994 |
|---|---|---|
| JP | 2008-242733 A | 10/2008 |
| JP | 2009-086761 A | 4/2009 |

OTHER PUBLICATIONS

S. Liao, M. W. K. Law and A. C. S. Chung, "Dominant Local Binary Patterns for Texture Classification," in IEEE Transactions on Image Processing, vol. 18, No. 5, pp. 1107-1118, May 2009. doi: 10.1109/TIP.2009.2015682 Accessed on Mar. 31, 2015 at http://ieeexplore.ieee.org/xpls/abs_all.jsp?arnumber=4808422&tag=1.*

Ahonen et al., "Face recognition with local binary patterns, Computer Vision", ECCV 2004 Proceedings, Lecture Notes in Computer Science 3021, Springer, pp. 469-481 (2004).

Dalal et al., "Histograms of Oriented Gradients for Human Detection", IEEE Computer Vision and Pattern Recognition, pp. 886-893, 2005.

* cited by examiner

*Primary Examiner* — Utpal Shah
(74) *Attorney, Agent, or Firm* — Carter, DeLuca, Farrell & Schmidt, LLP

(57) ABSTRACT

The feature amount of each pixel of an image is received. If the frequency value of the feature amount is registered in the second memory accessible at higher speed than the first memory which stores frequency values of respective feature amounts, the frequency value in the second memory is increased. If the frequency value is not registered, the frequency value is read out from the first memory into the second memory, and increased. With this processing, a histogram of the feature amounts of the respective pixels of the image is generated. The bins of the histogram are rearranged so that bins with high frequency values are close to each other in the histogram.

10 Claims, 14 Drawing Sheets

F I G. 6
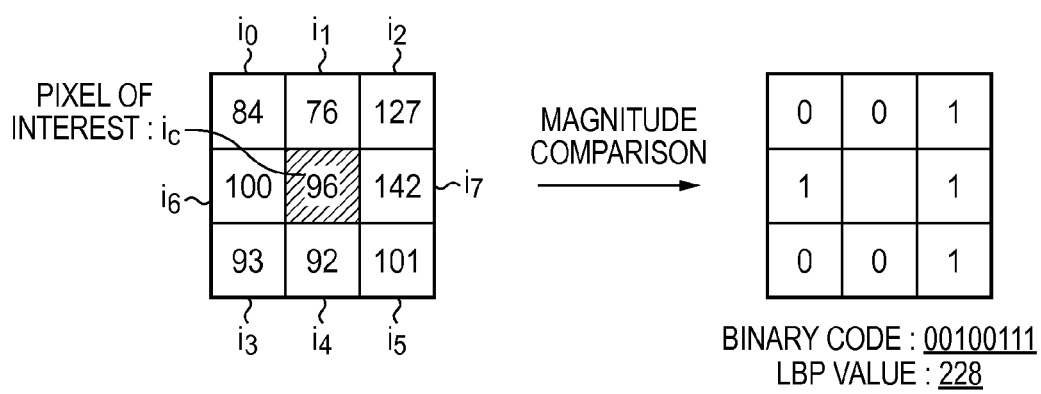

FIG. 8

|  | TOTAL VALUE OF FREQUENCY VALUES |
|---|---|
| 0 0 0 0 0 0 * * | 48 |
| 0 0 0 0 0 1 * * | 126 |
| 0 0 0 0 1 0 * * | 369 |
| 0 0 0 0 1 1 * * | 98 |
| 0 0 0 1 0 0 * * | 142 |
| ⋮ | ⋮ |
| 0 0 1 0 0 1 * * | 12672 |
| ⋮ | ⋮ |
| 1 1 1 1 1 1 * * | 24 |

FIG. 9A

| FREQUENCY VALUE | ORIGINAL INDEX | REARRANGED INDEX | TRANSFORMED INDEX |
|---|---|---|---|
| 25 | 0 0 0 0 0 0 0 0 | 0 0 0 0 0 0 0 0 | 0 0 1 0 0 1 0 0 |
| ⋮ | ⋮ | ⋮ | ⋮ |
| 48 | 0 0 0 0 1 0 0 1 | 1 0 0 0 0 0 0 1 | 1 0 1 0 0 1 0 1 |
| 26 | 0 0 0 0 1 0 1 0 | 0 1 0 0 0 0 0 1 | 0 1 1 0 0 1 0 1 |
| 32 | 0 0 0 0 1 0 1 1 | 1 1 0 0 0 0 0 1 | 1 1 1 0 0 1 0 1 |
| ⋮ | ⋮ | ⋮ | ⋮ |
| 1304 | 0 0 1 0 0 1 0 0 | 0 0 1 0 1 0 0 0 | 0 0 0 0 1 1 0 0 |
| ⋮ | ⋮ | ⋮ | ⋮ |
| 10 | 1 1 1 1 1 1 1 1 | 1 1 1 1 1 1 1 1 | 1 1 0 1 1 0 1 1 |

FIG. 9B

| FREQUENCY VALUE | TRANSFORMED INDEX |
|---|---|
| 1304 | 0 0 0 0 0 0 0 0 |
| ⋮ | ⋮ |
| 25 | 0 0 1 0 0 1 0 0 |
| ⋮ | ⋮ |
| 48 | 0 0 1 0 1 1 0 1 |
| 26 | 0 0 1 0 1 1 1 0 |
| 32 | 0 0 1 0 1 1 1 1 |
| ⋮ | ⋮ |
| 10 | 1 1 0 1 1 0 1 1 |
| ⋮ | ⋮ |

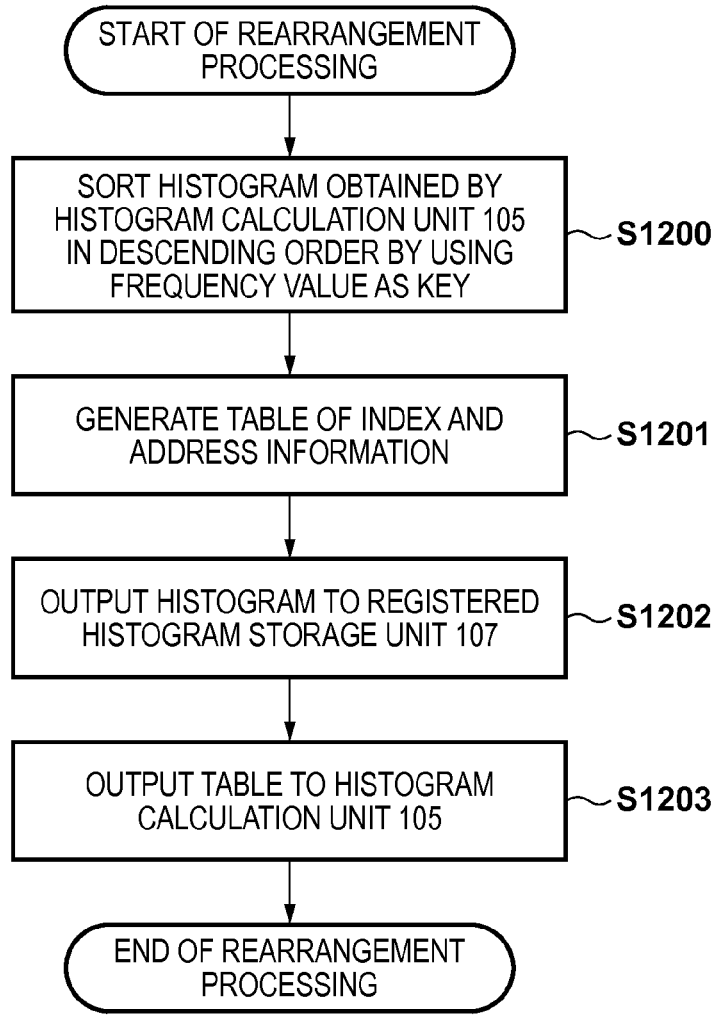

IMAGE PROCESSING APPARATUS AND IMAGE PROCESSING METHOD

BACKGROUND OF THE INVENTION

Field of the Invention

The present invention relates to a histogram generation technique.

Description of the Related Art

Generating a histogram for input data is an effective method of acquiring statistic information of the input data (for example, identifying an input data value having a highest appearance frequency). In general, a histogram is generated using a storage element such as a memory or counter. For example, if a memory is used, a histogram is generated by storing a data value count (frequency value) is stored at a memory address corresponding to a data value. At this time, a value corresponding to the data value is read out from a low-speed memory (for example, a DRAM or the like) into a memory (for example, a cache memory or the like) accessible at high speed by a processing processor such as a CPU, the data value is added to the readout value, and the resultant value is written back in a low-speed memory such as a DRAM. With the above procedure, a histogram is generated. When generating such histogram, the following method is proposed as a method of shortening the memory access time.

According to Japanese Patent Laid-Open No. 2009-86761, a data area is read out into a high-speed memory using a memory having a hierarchical structure, thereby performing an addition operation. After adding input data, the data area is held on the high-speed memory. When the next input data is input, it is determined whether an area to be voted is on the high-speed memory. If the area is on a work memory, the area is voted continuously; otherwise, the area is replaced. Thus, the speed is increased.

According to Japanese Patent Laid-Open No. 6-36028, one input data is held. Then, when the next data coincides with the held data, 2 is added to the value of a bin. This decreases the access count to a memory, thereby increasing the speed.

According to Japanese Patent Laid-Open No. 2008-242733, some of a plurality of input data are masked to generate address data, a memory for generating a histogram is accessed according to the generated address, and 1 is added to count information identified by the address, thereby generating a histogram. With this method, it is only necessary to access one histogram instead of accessing a plurality of histograms, resulting in a decrease in access count to the memory. This can increase the speed.

One application of high-speed histogram generation is pattern recognition in the field of signal processing techniques. A method of determining the similarity between two images by obtaining the luminance histograms or color histograms of two images for which the similarity is to be calculated, and calculating the similarity between the color histograms is conventionally known as a method often used to calculate the similarity between two images.

A method of determining the similarity by calculating a histogram with respect to LBP (Local Binary Pattern) values obtained by coding the magnitude relationships with the luminance values of peripheral pixels is proposed in Timo Ahonen, Abdenour Hadid, and Matti Pietikainen, "Face recognition with local binary patterns, Computer Vision", ECCV 2004 Proceedings, Lecture Notes in Computer Science 3021, Springer, 469-481. An LBP operator for a pixel (pixel of interest) at a position $(x_c, y_c)$ is defined by:

$$LBP8(x_c, y_c) = \sum_{n=0}^{7} s(i_n - i_c) 2^n \qquad (1)$$

$$s(x) = \begin{cases} 1 & \text{if } x \geq 0 \\ 0 & \text{if } x < 0 \end{cases} \qquad (2)$$

where $i_c$ represents the luminance value of the pixel at the position $(x_c, y_c)$, and $i_n$ represents the luminance value of a pixel with an index=n among eight peripheral pixels. Note that n represents the index of the peripheral pixel. With respect to the position $(x_c, y_c)$, n=7 is set for the upper left pixel and n is decremented by one in a clockwise direction. Equations (1) and (2) are merely an example of calculation of an LBP operator. There is also known an extended method in which a radius (the distance between the pixel of interest and a peripheral pixel) and a division count of the circumference of a circle with the radius are set as parameters.

A practical example of the calculation based on equations (1) and (2) will be described with reference to FIG. 2. When the pixel of interest ($i_c$=96) at the central position $(x_c, y_c)$ and its eight peripheral pixels are arranged as shown in the left view of FIG. 2, 1 or 0 is assigned according to the magnitude relationship (the right view of FIG. 2). The assigned value of 1 or 0 will be referred to a quantization value in a sense that binary quantization is performed for a difference value. A bit string obtained by arranging the quantization values will be referred to as a binary code. An LBP value is obtained by giving a weight of a power of 2 to the respective quantization values, and adding them. In the method described in Timo Ahonen, Abdenour Hadid, and Matti Pietikainen, "Face recognition with local binary patterns, Computer Vision", ECCV 2004 Proceedings, Lecture Notes in Computer Science 3021, Springer, 469-481, face recognition processing is performed by setting a thus obtained LBP value as the index of each bin and calculating a histogram. An LBP value is calculated based on the magnitude relationship between luminance values, and is thus expected to be robust against an illumination variation, as compared with a simple luminance value.

As described above, there have been proposed various methods described in the background of the invention as a method of shortening the memory access time at the time of generating a histogram. However, the respective methods have the following problems.

In the method described in Japanese Patent Laid-Open No. 2009-86761, it is possible to increase the speed only for data in which each input data value gradually changes. If continuous input data do not exist in one area, a low-speed memory is accessed, and thus the speed cannot be increased.

In the method described in Japanese Patent Laid-Open No. 6-36028, it is possible to increase the speed only if continuous input data coincide with each other. If preceding and subsequent input data are different from each other, it is impossible to increase the speed.

In the method described in Japanese Patent Laid-Open No. 2008-242733, when it is not necessary to correctly vote, some of input data are masked by image processing or the like. This reduces bit information of the input data to generate a histogram at high speed. Since, however, the bit information is reduced, this method cannot be used when the information needs to be held.

SUMMARY OF THE INVENTION

The present invention has been made in consideration of the above problems, and provides a technique for shortening the time taken to generate a histogram via memory access.

According to the first aspect of the present invention, there is provided an image processing apparatus comprising: a first memory configured to store frequency values of respective feature amounts; a second memory configured to store some of the frequency values stored in the first memory, wherein the second memory has smaller capacity than the first memory and is accessible at higher speed than the first memory; a generation unit configured to generate a histogram of feature amounts of respective pixels of an image by receiving the feature amount of each pixel of the image and, if a frequency value of the feature amount is registered in the second memory, increasing the frequency value in the second memory, and, if the frequency value is not registered in the second memory, reading out the frequency value from the first memory into the second memory, and increasing the frequency value in the second memory; and a rearranging unit configured to rearrange bins of the histogram so that bins with high frequency values are close to each other in the histogram.

According to the second aspect of the present invention, there is provided an image processing method for an image processing apparatus, which comprises: a first memory configured to store frequency values of respective feature amounts; and a second memory configured to store some of the frequency values stored in the first memory, the second memory having smaller capacity than the first memory and is accessible at higher speed than the first memory, the method comprising: generating a histogram of feature amounts of respective pixels of an image by receiving the feature amount of each pixel of the image and, if a frequency value of the feature amount is registered in the second memory, increasing the frequency value in the second memory, and, if the frequency value is not registered in the second memory, reading out the frequency value from the first memory into the second memory, and increasing the frequency value in the second memory; and rearranging bins of the histogram so that bins with high frequency values are close to each other in the histogram.

Further features of the present invention will become apparent from the following description of exemplary embodiments (with reference to the attached drawings).

BRIEF DESCRIPTION OF THE DRAWINGS

FIG. 6 is a view for explaining a selection order and an LBP;

FIG. 8 is a view showing examples of total values;

FIGS. 9A and 9B are views for explaining the relationship between a bin and a frequency value;

FIG. 12 is a flowchart illustrating details of processing in step S507;

FIG. 13 is a view showing an example of a table generated in step S1201;

DESCRIPTION OF THE EMBODIMENTS

Embodiments of the present invention will be described below with reference to the accompanying drawings. Note that the embodiments to be described below are merely examples when the present invention is practiced concretely, and are practical embodiments of arrangements described in the appended claims.

[First Embodiment]

In this embodiment, an example of a technique of generating a histogram, and transforming the bins of the histogram so that bins with high appearance frequencies (bins with high histogram values) are processed as bins at close positions in the histogram will be described. As an example, a technique of generating a histogram to be used for face recognition, and transforming the bins of the histogram for the above purpose will be explained below. Assume that all images to be processed are grayscale images, that is, so-called luminance images for the sake of simplicity.

An example of the functional arrangement of an image processing apparatus which generates a histogram for face recognition and transforms the bins of the histogram for the above purpose will be described with reference to a block diagram shown in FIG. 1. An image processing apparatus 100 shown in FIG. 1 has a mode (first mode) of generating a histogram for face recognition and transforming the bins of the histogram for the above purpose, and a mode (second mode) of performing face recognition processing for an input image using the histogram, and executes processing according to a set mode.

A face detection unit 101 identifies, from an input image, the position, size, direction, and the like of a face in the image, normalizes the size of a region of the face in the image using the identified pieces of information, and cuts out and outputs an image within the region, that is, a face image so that the direction of the face is set in a predetermined one (for example, the face is set in an erect state). Note that there are provided various processes of detecting, from an image, a region of a face in the image, and outputting an image within the detected region as a face image. These processes are well-known techniques and a description thereof will be omitted.

Note that a face image in an input image is targeted in this embodiment. The present invention, however, is not limited to this. The whole input image may be targeted, or a face image may be input instead of the input image.

Figure 3:
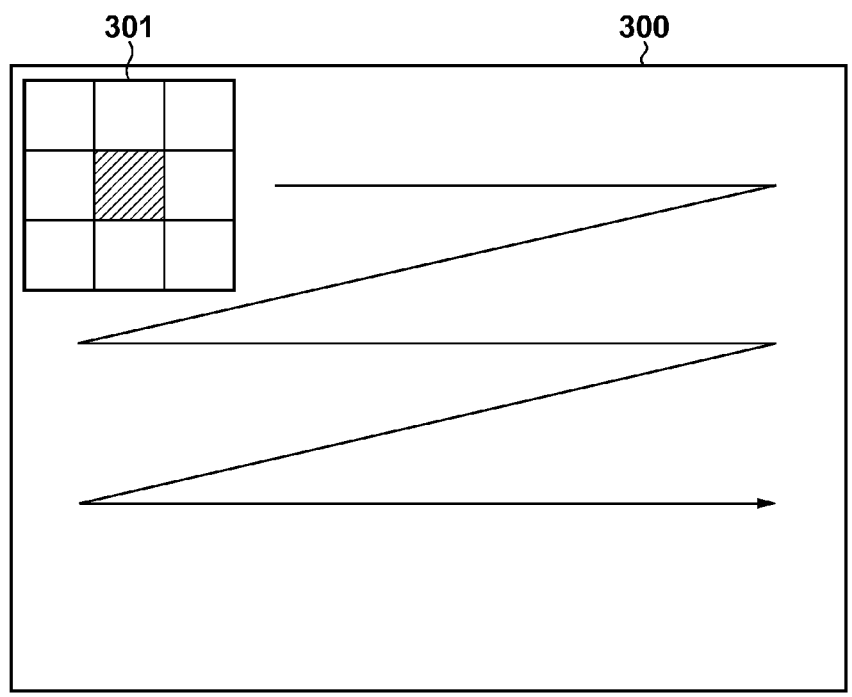
FIG. 3 is a view schematically showing processing of arranging a window having a predetermined size at each pixel position of a face image.

A scan window processing unit 102 arranges a window having a predetermined size at each pixel position in the face image, and sends the pixel values of the respective pixels of the arranged window to a histogram generation unit 103 of the succeeding stage. FIG. 3 is a view schematically showing processing of arranging a window having a predetermined size at each pixel position in a face image. Referring to FIG. 3, in a face image 300, a window 301 having a size of 3 pixels×3 pixels is arranged at each pixel position from the upper left corner pixel position to the lower right corner pixel position in the raster scan order. The following description assumes that the window has a size of 3 pixels×3 pixels, as shown in FIG. 3. Even if the window has a size of M pixels×N pixels (M and N are integers of 3 or more), the essence of the following description does not change.

Upon receiving the pixel values at the respective pixel positions in the window from the scan window processing unit 102, the histogram generation unit 103 generates a bit string representing the magnitude relationships between the pixel value at the central pixel position (a hatched pixel position in FIG. 3) of the window and the pixel values at the peripheral pixel positions of the central pixel position. Since the window is arranged at each pixel position in the face image, a bit string is obtained for each pixel position in the face image. The histogram generation unit 103 obtains an LBP corresponding to each generated bit string, and generates a histogram by setting the LBP as a bin and setting the appearance frequency of the bit string corresponding to the LBP in the face image as a histogram value. The histogram generation unit 103 transforms the bins of the histogram so that bins with high appearance frequencies (bins with high histogram values) are processed as bins at close positions in the histogram. The histogram generation unit 103 outputs the histogram whose bins have been transformed to a registered histogram storage unit 107 or a correlation value calculation unit 108 according to a currently set mode.

The operation of the histogram generation unit 103 will be described in more detail below. As shown in FIG. 1, the histogram generation unit 103 includes an input data generation unit 104, a histogram calculation unit 105, and a rearrangement processing unit 106.

Upon receiving the pixel values at the respective pixel positions in the window from the scan window processing unit 102, the input data generation unit 104 generates a bit string representing the magnitude relationships between the pixel value at the central pixel position of the window and the pixel values at the peripheral pixel positions of the central pixel position.

Figure 2:
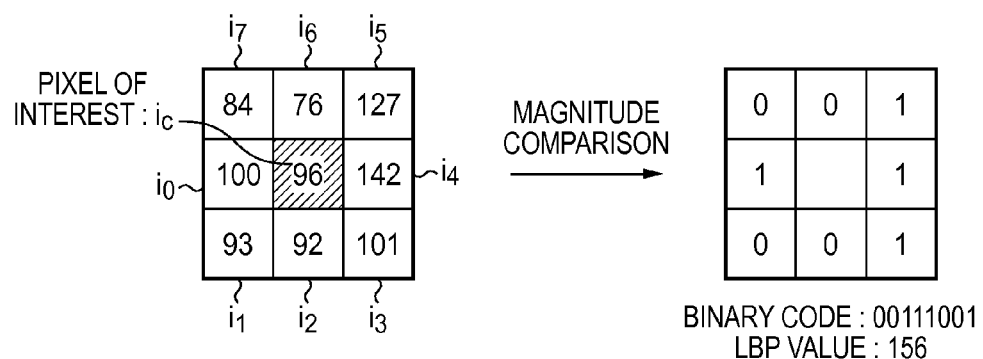
FIG. 2 is a view for explaining processing of obtaining an LBP.

Assume that the pixel values of the respective pixels in the window are in the state shown in the left view of FIG. 2. In this case, the magnitude of a pixel value i0 of a pixel (to be referred to as pixel 0 hereinafter) at the pixel position on the left side of the central pixel position is compared with that of a pixel value ic of the pixel at the central pixel position. In FIG. 2, since i0>ic, a bit value "1" is assigned to pixel 0. Next, the magnitude of a pixel value i1 of a pixel (to be referred to as pixel 1 hereinafter) at the lower left pixel position with respect to the central pixel position is compared with that of the pixel value ic. In FIG. 2, since i1<ic, a bit value "0" is assigned to pixel 1. The magnitude of a pixel value i2 of a pixel (to be referred to as pixel 2 hereinafter) at the pixel position immediately below the central pixel position is compared with that of the pixel value ic. In FIG. 2, since i2<ic, a bit value "0" is assigned to pixel 2. The magnitude of a pixel value i3 of the pixel (to be referred to as pixel 3 hereinafter) at the lower right pixel position with respect to the central pixel position is compared with that of the pixel value ic. In FIG. 2, since i3>ic, a bit value "1" is assigned to pixel 3. The magnitude of a pixel value i4 of a pixel (to be referred to as pixel 4 hereinafter) at the pixel position on the right side of the central pixel position is compared with that of the pixel value ic. In FIG. 2, since i4>ic, a bit value "1" is assigned to pixel 4. The magnitude of a pixel value i5 of a pixel (to be referred to as pixel 5 hereinafter) at the upper right pixel position with respect to the central pixel position is compared with that of the pixel value ic. In FIG. 2, since i5>ic, a bit value "1" is assigned to pixel 5. The magnitude of a pixel value i6 of a pixel (to be referred to as pixel 6 hereinafter) at the pixel position immediately above the central pixel position is compared with that of the pixel value ic. In FIG. 2, since i6<ic, a bit value "0" is assigned to pixel 6. The magnitude of a pixel value i7 of a pixel (to be referred to as pixel 7 hereinafter) at the upper left pixel position with respect to the central pixel position is compared with the pixel value ic. In FIG. 2, since i7<ic, a bit value "0" is assigned to pixel 7.

With this processing, it is possible to assign the bit value "1" or "0" to each of pixels 0 to 7, as shown in the right view of FIG. 2. Consequently, a bit string generated by the input data generation unit 104 in the case of FIG. 2 is a bit string "00111001" of 8 bits formed by arranging bit values in the order of the bit value of pixel 0, that of pixel 1, . . . , and that of pixel 7.

The input data generation unit 104 obtains, as an LBP corresponding to the bit string representing the magnitude relationships between the pixel value at the central pixel position of the window and the pixel values at the peripheral pixel positions of the central pixel position, a value (a result of calculating equations (1) and (2) using the bit string) by expressing the generated bit string by a decimal number. In FIG. 2, a value "156" is obtained by expressing the bit string "00111001" by a decimal number (by calculating equations (1) and (2) above using the bit string), and is an LBP obtained by the input data generation unit 104 in the case of FIG. 2.

As described above, since a bit string is obtained for each pixel position in the face image, obtaining an LBP corresponding to each bit string is equivalent to obtaining an LBP for each pixel position in the face image.

The histogram calculation unit 105 generates a histogram with LBPs as bins and the frequency values (appearance frequencies) of the bins as histogram values by using the LBPs which have been obtained by the input data generation unit 104 for the respective pixel positions in the face image. This can generate a histogram representing a specific LBP which appears at a specific appearance frequency in the face image.

Figure 4:
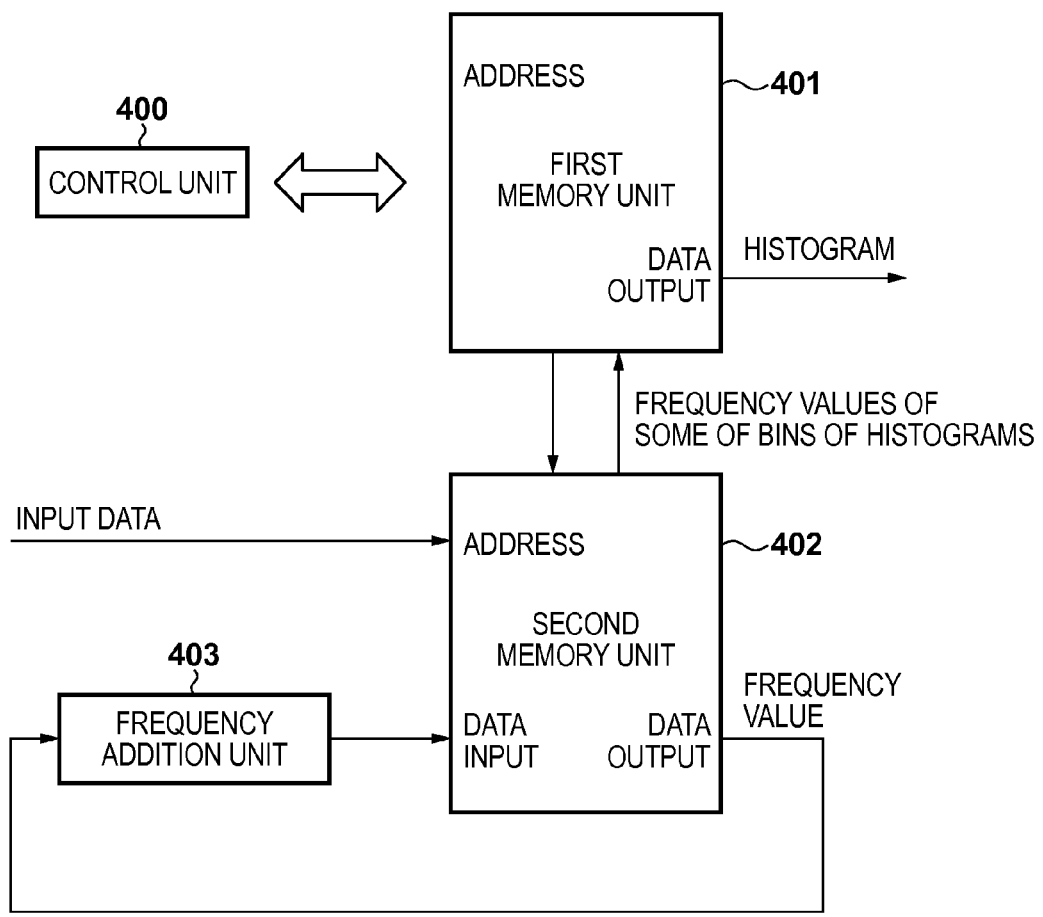
FIG. 4 is a block diagram showing an example of the arrangement of a histogram calculation unit 105.

An example of the arrangement of the histogram calculation unit 105 will be described with reference to a block diagram shown in FIG. 4. A first memory unit 401 is a memory for storing the frequency values of all bins obtained so far. A second memory unit 402 is a memory for storing some frequency values of bins among the frequency values stored in the first memory unit 401. When generating a histogram, a control unit 400 reads out, from the first memory unit 401, necessary ones of the frequency values stored in the first memory unit 401, and stores them in the second memory unit 402.

The first memory unit 401 is a memory whose data capacity is large and memory access speed is low, as compared with the second memory unit 402, and is implemented by, for example, a DRAM. The second memory unit 402 is a memory whose data capacity is small and memory access speed is high, as compared with the first memory unit 401, and is implemented by, for example, a cache memory in a CPU (for example, the control unit 400).

When reading out data in a memory area of the first memory unit 401 into the second memory unit 402, a tag of address information on the first memory unit 401, which is associated with the data to be read out, is added to the data. More specifically, if the size of the data area (data to be actually processed such as bins and frequency values) is 32 bytes and an address is a 32-bit address, 27 bits as common bits of the respective data are stored as an address portion of a tag. A combination of the tag and data area is called a cache line. The first memory unit 401 and the second memory unit 402 perform data transfer for each cache line. Note that the size of the data area, the bit count, and the like are merely for description, and the following description is not limited to those practical values.

The second memory unit 402 receives the LBP sent from the input data generation unit 104. If the frequency value of the received LBP is stored in the second memory unit 402, a frequency addition unit 403 updates the frequency value by adding 1 to it. If the frequency value of the received LBP is not stored in the second memory unit 402, the control unit 400 moves contents stored in the second memory unit 402 to the first memory unit 401, and reads out the frequency value of the received LBP from the first memory unit 401 into the second memory unit 402. The frequency addition unit 403 updates the readout frequency value by adding 1 to it. To access the first memory unit 401 and the second memory unit 402, the above address information is used.

When the first mode is set, the histogram calculation unit 105 sends the generated histogram to the rearrangement processing unit 106. When the second mode is set, the histogram calculation unit 105 sends the generated histogram to the correlation value calculation unit 108.

Referring back to FIG. 1, the rearrangement processing unit 106 transforms the bins of the histogram generated by the histogram calculation unit 105 so that bins with high appearance frequencies are processed as bins at close positions in the histogram. The rearrangement processing unit 106 then stores, in the registered histogram storage unit 107, the histogram whose bins have been transformed.

With respect to each histogram (second histogram: histogram for each face) stored in the registered histogram storage unit 107, the correlation value calculation unit 108 recognizes a face in an inspection image (an image to be checked to determine whether a face to be recognized is included) by using the second histogram and a histogram (first histogram) generated by the histogram calculation unit 105 for the inspection image. More specifically, the correlation value calculation unit 108 calculates, for each bin, the difference value between the frequency value of the bin in the first histogram and that of the bin in the second histogram, and obtains, as the correlation value between the first and second histograms, the total value of the difference values obtained for the respective bins.

An integrated determination unit 109 compares the magnitude of the correlation value obtained by the correlation value calculation unit 108 for each second histogram with the magnitude of a threshold. If there is a correlation value equal to or smaller than the threshold, the integrated determination unit 109 determines that a face image detected from the inspection image is an image of the face of a human corresponding to the second histogram for which the correlation value equal to or smaller than the threshold has been obtained, and outputs information indicating it. On the other hand, if there is no correlation value equal to or smaller than the threshold, the integrated determination unit 109 determines that a face image detected from the inspection image includes none of faces corresponding to the histograms stored in the registered histogram storage unit 107, and outputs information indicating it. A method of recognizing a face using a histogram is not limited to the above one, and various methods can be used, as a matter of course. The output destination and output form of the integrated determination unit 109 are not limited to specific ones.

Processing executed by the image processing apparatus 100 according to this embodiment when the first mode is set will be described with reference to FIG. 5 which is a flowchart illustrating the processing. Note that at the start of the processing according to the flowchart shown in FIG. 5, the face detection unit 101 has already extracted a face image from an input image, and sent the extracted face image to the scan window processing unit 102.

<Step S500>

The scan window processing unit 102 arranges a window at a pixel position (x, y) (initial values are x=2 and y=2) on the face image. Since the scan window processing unit 102 sends the pixel values of the respective pixels of the window to the input data generation unit 104, the input data generation unit 104 generates a bit string representing the magnitude relationships between the pixel value at the central pixel position of the window and the pixel values at the peripheral pixel positions of the central pixel position. The input data generation unit 104 calculates a corresponding LBP as a feature amount by calculating equations (1) and (2) above using the generated bit string, and sends the calculated LBP to the histogram calculation unit 105.

<Step S501>

The frequency addition unit 403 of the histogram calculation unit 105 determines whether the frequency value of the LBP sent from the input data generation unit 104 is stored in the second memory unit 402. If it is determined that the frequency value of the LBP is stored, the process advances to step S504; otherwise, the process advances to step S502.

<Step S502>

The control unit 400 moves (writes back) all data stored in the second memory unit 402 to the first memory unit 401. Since the second memory unit 402 holds data of a bin with a feature amount as an index, and a tag including address information on the first memory unit 401, the control unit 400 writes back the data into the first memory unit 401 based on the address information included in the tag.

<Step S503>

The control unit 400 reads out, from the first memory unit 401, the frequency value of the LBP sent from the input data generation unit 104, and stores it in the second memory unit 402 (in fact, in addition to the frequency value, the above additional data such as address information is read out).

<Step S504>

The frequency addition unit 403 adds 1 to "the frequency value of the LBP sent from the input data generation unit 104" stored in the second memory unit 402, thereby updating the frequency value.

<Step S505>

The scan window processing unit 102 determines whether the current position (x, y) of the window moved on the face image has reached the final pixel position (x=Q-2 and y=P-2 when the face image has a size of P pixels in the vertical direction and Q pixels in the horizontal direction). If it is determined that the current position has reached the final pixel position, the process advances to step S506. On the other hand, if it is determined that the current position has not reached the final pixel position yet, 1 is added to x or, when x=Q-2, x=0 is set and 1 is added to y, thereby changing the position of the window. The process then returns to step S500.

<Step S506>

Similarly to step S502 above, the control unit 400 moves all the data stored in the second memory unit 402 to the first memory unit 401. At this time, the first memory unit 401 stores "the histogram with the LBPs as the indices of bins and the frequency values for the bins as histogram values" generated for the face image.

<Step S507>

Figure 7:
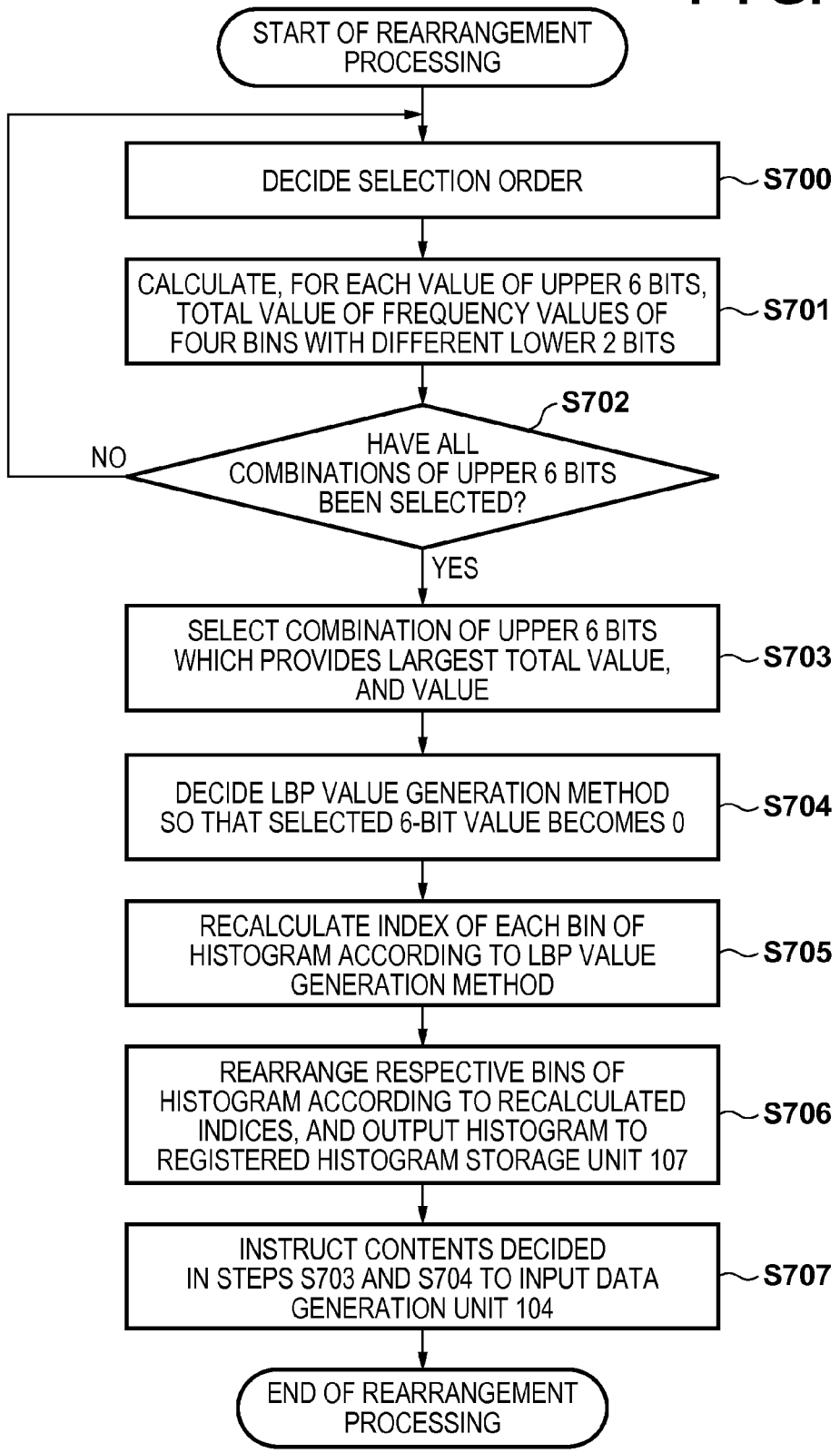
FIG. 7 is a flowchart illustrating details of processing in step S507.

The rearrangement processing unit 106 transforms the bins of the histogram so that bins with high appearance frequencies are processed as bins at close positions in the histogram generated by the histogram calculation unit 105. The processing of transforming the bins of the histogram so that bins with high appearance frequencies are processed as bins at close positions is processing for the purpose of improving the memory access efficiency and increasing the speed of a histogram generation operation. Any rearrangement processing of improving the memory access efficiency and increasing the speed may be adopted. In this embodiment, bins with high frequency values are stored in one cache line to reduce the frequency of processing of replacing a cache line and decrease the number of accesses to the first memory unit 401, thereby improving the memory access efficiency. The processing in step S507 will be described in detail with reference to FIG. 7 which is a flowchart illustrating the processing.

<Step S700>

One pixel (pixel position) selection order of eight pixels surrounding the central pixel is selected. In the following description, P0 represents a pixel (position) on the left side of the central pixel position; P1, a lower left pixel with respect to the central pixel position; P2, a pixel immediately below the central pixel position; P3, a lower right pixel with respect to the central pixel position; P4, a pixel on the right side of the central pixel position; P5, an upper right pixel with respect to the central pixel position; P6, a pixel immediately above the central pixel position; and P7, an upper left pixel with respect to the central pixel position. In this case, in step S700, for example, the selection order of the pixels P7, P6, P5, P1, P2, P3, P0, and P4 is decided (FIG. 6).

<Step S701>

For each of bit strings "000000" to "111111" of 6 bits, four bit strings of 8 bits, each of which includes the bit string of 6 bits as an upper bit string and lower bits "00", "01", "10", or "11", are generated. In this way, for each of the bit strings "000000" to "111111" of 6 bits, bit strings with four kinds of lower bits (four bit strings (8 bits)) are generated.

For each of the bit strings "000000" to "111111" of 6 bits, the total value of frequency values for the bit strings of 8 bits, each of which includes the bit string of 6 bits as an upper bit string and lower bits "00", "01", "10", or "11", is calculated.

To do this, each of the generated bit strings of 8 bits is considered as "a bit string obtained by selecting the eight pixels surrounding the central pixel in the above selection order, and arranging the bit values for the selected pixels in the selection order (in the above example, the first to eighth bits represent the bit values at the pixel positions P7, P6, P5, P1, P2, P3, P0, and P4, respectively)". At this time, for each of the bit strings of 8 bits, a new bit string of 8 bits is generated by rearranging the bits, that is, arranging the bit value of the bit position corresponding to P0 (the bit value of the seventh bit) at the first bit, arranging the bit value of the bit position corresponding to P1 (the bit value of the fourth bit) at the second bit, arranging the bit value of the bit position corresponding to P2 (the bit value of the fifth bit) at the third bit, arranging the bit value of the bit position corresponding to P3 (the bit value of the sixth bit) at the fourth bit, arranging the bit value of the bit position corresponding to P4 (the bit value of the eighth bit) at the fifth bit, arranging the bit value of the bit position corresponding to P5 (the bit value of the third bit) at the sixth bit, arranging the bit value of the bit position corresponding to P6 (the bit value of the second bit) at the seventh bit, and arranging the bit value of the bit position corresponding to P7 (the bit value of the first bit) at the eighth bit. The new bit string corresponds to any one of the bins (LBPs) of the histogram. Therefore, when calculating the total value of the frequency values for the four bit strings as described above, it is possible to calculate the total value of frequency values for new bit strings each generated by rearranging the bits of each of the four bit strings.

With this processing, for each of the bit strings "000000" to "111111" of 6 bits, the total value of frequency values for four bit strings of 8 bits, each of which includes the bit string of 6 bits as an upper bit string and lower bits "00", "01", "10" or "11", is obtained.

FIG. 8 shows examples of the total values obtained for the bit strings "000000" to "111111" of 6 bits. Referring to FIG. 8, "*" represents "00", "01", "10", or "11". For example, in the top row, the total of the frequency values obtained by the above processing for "00000000", "00000001", "00000010", and "00000011" is "48".

<Step S702>

There are a plurality of selection orders of the eight pixels surrounding the central pixel, and it is determined whether all the selection orders have been selected. If it is determined that all the selection orders have been selected, the process advances to step S703; otherwise, the process returns to step S700 to select an unselected selection order.

<Step S703>

The "selection order" used to calculate a largest total value and the bit string of 6 bits at this time (in the above example, the bit string of 6 bits used as an upper bit string) are registered in a memory (not shown).

<Step S704>

A transforming method (LBP value generation method) in which bit values at respective bit positions of the 6 bits stored in the memory in step S703 become equal to each other is set. In this embodiment, a transforming method which sets the bit values at the respective bit positions of the 6 bits stored in the memory in step S703 to "0" is set. If, for example, the 6 bits are "001001", it is only necessary to invert the bit values "1" of the third and sixth bits to "0". In this case, a transforming method is to "invert the bit values of the third and sixth bits". Assume that i0 to i7 represent the pixel values of the first to eighth pixels when the eight pixels surrounding the central pixel are selected in the above selection order. In this case, a transforming method for the 6 bits "001001" is given by:

$$LBP8(x_c, y_c) = \sum_{n=0}^{7} s\{t(n)(i_n - i_c)\}2^n \quad (3)$$

$$t(x) = \begin{cases} 1 & \text{if } x \neq 2, 5 \\ -1 & \text{if } x = 2, 5 \end{cases} \quad (4)$$

<Step S705>

Each bin, that is, each LBP of the histogram is read out, and a bit string of 8 bits represented by the readout LBP is considered as "a bit string obtained by selecting the eight pixels surrounding the central pixel in the above selection order (the selection order stored in the memory in step S703), and arranging the bit values for the selected pixels in the selection order (in the above example, the first to eighth bits represent the bit values at the pixel positions P7, P6, P5, P1, P2, P3, P0, and P4, respectively)". At this time, for each of the bit strings of 8 bits, a new bit string of 8 bits is generated by arranging the bit value of the bit position corresponding to P0 (the bit value of the seventh bit) at the first bit, arranging the bit value of the bit position corresponding to P1 (the bit value of the fourth bit) at the second bit, arranging the bit value of the bit position corresponding to P2 (the bit value of the fifth bit) at the third bit, arranging the bit value of the bit position corresponding to P3 (the bit value of the sixth bit) at the fourth bit, arranging the bit value of the bit position corresponding to P4 (the bit value of the eighth bit) at the fifth bit, arranging the bit value of the bit position corresponding to P5 (the bit value of the third bit) at the sixth bit, arranging the bit value of the bit position corresponding to P6 (the bit value of the second bit) at the seventh bit, and arranging the bit value of the bit position corresponding to P7 (the bit value of the first bit) at the eighth bit. A transformed bit string (8 bits) is obtained by applying the above transforming method to the generated bit string, and a corresponding LBP (transformed LBP) is obtained from the transformed bit string. In the above example, a transformed bit string is obtained by inverting the bit values of the third and sixth bits of the new bit string of 8 bits.

The processing in this step will be described with reference to FIG. 9A. Assume that the first to eighth bits of each of bins (original indices) of 00000000 to 11111111 represent the bit values at the pixel positions P7, P6, P5, P1, P2, P3, P0, and P4, respectively. For each bin, a "rearranged index" is obtained by rearranging the bits corresponding to P0 to P7 of the bin at the first to eighth bits. A "transformed index" is obtained by inverting the third and sixth bits of the "rearranged index". As described above, in this step, the LBP of each bin of the histogram is transformed.

<Step S706>

In the processing in step S705, the value (old LBP) of each bin of the histogram is transformed into a transformed LBP. Therefore, the respective bins (and corresponding frequency values) of the histogram are rearranged by sorting the sets of the transformed LBPs and the frequency values of the old LBPs corresponding to the transformed LBPs in ascending order of the transformed LBP (in other words, in descending order of the frequency value).

With this processing, a histogram is generated so that bins predicted to have high frequency values in the second mode are stored in the first cache line. Note that the present invention is not limited to a case in which bins predicted to have frequency values in the second mode are stored in the first cache line. These bins may be stored in the last cache line or a cache line at a designated address.

Figure 11A:
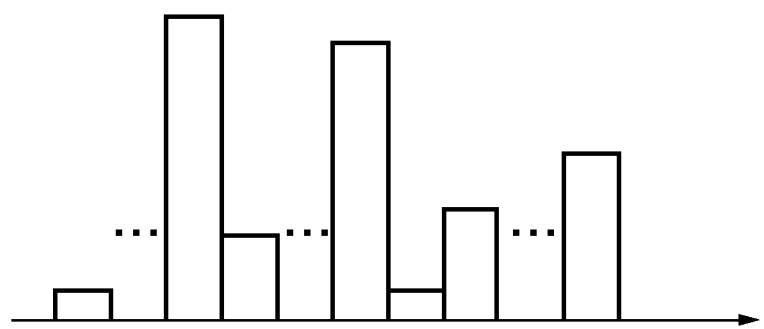
FIGS. 11A and 11B are views for explaining histograms before and after the processing in step S507.
Figure 11B:
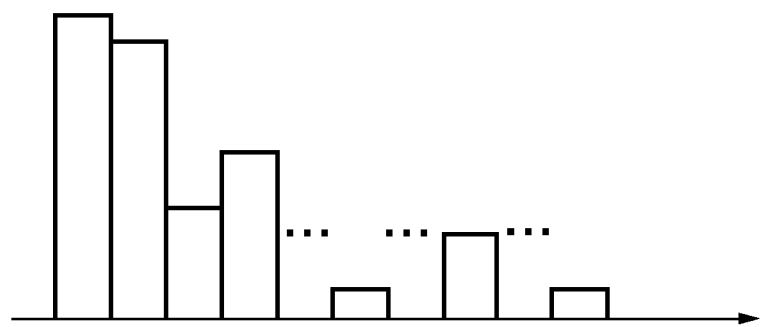

The respective bins of the histogram are rearranged, as shown in FIG. 9B, by sorting the sets of the "transformed indices" and corresponding "frequency values" shown in FIG. 9A in ascending order of the LBP represented by the "transformed index" (in other words, in descending order of the frequency value). FIG. 11A shows an example of a given histogram before the start of the processing in step S507, and FIG. 11B shows an example of the given histogram after the processing in step S507 is performed.

If the face image has a size of 320 pixels×240 pixels, the largest frequency value is 76800. A memory capacity necessary for this is 4 bytes when the frequency value is an integer. Thus, a memory capacity necessary for storing four bins is 16 bytes. Consequently, a cache line size need only be about 17 bytes including tag information. Note that if the cache line size is larger, four or more bins may be rearranged to be stored in one cache line.

Data of the thus generated histogram is stored in the registered histogram storage unit 107.

<Step S707>

The input data generation unit 104 is notified of the "selection order" stored in the memory in step S703 and the "transforming method" set in step S704.

Note that in this embodiment, bins having high frequency values are stored in the first cache line in the first mode. If, however, bins to have high frequencies are known in advance, decision may be manually performed in advance instead of performing calculation in the first mode.

Figure 10:
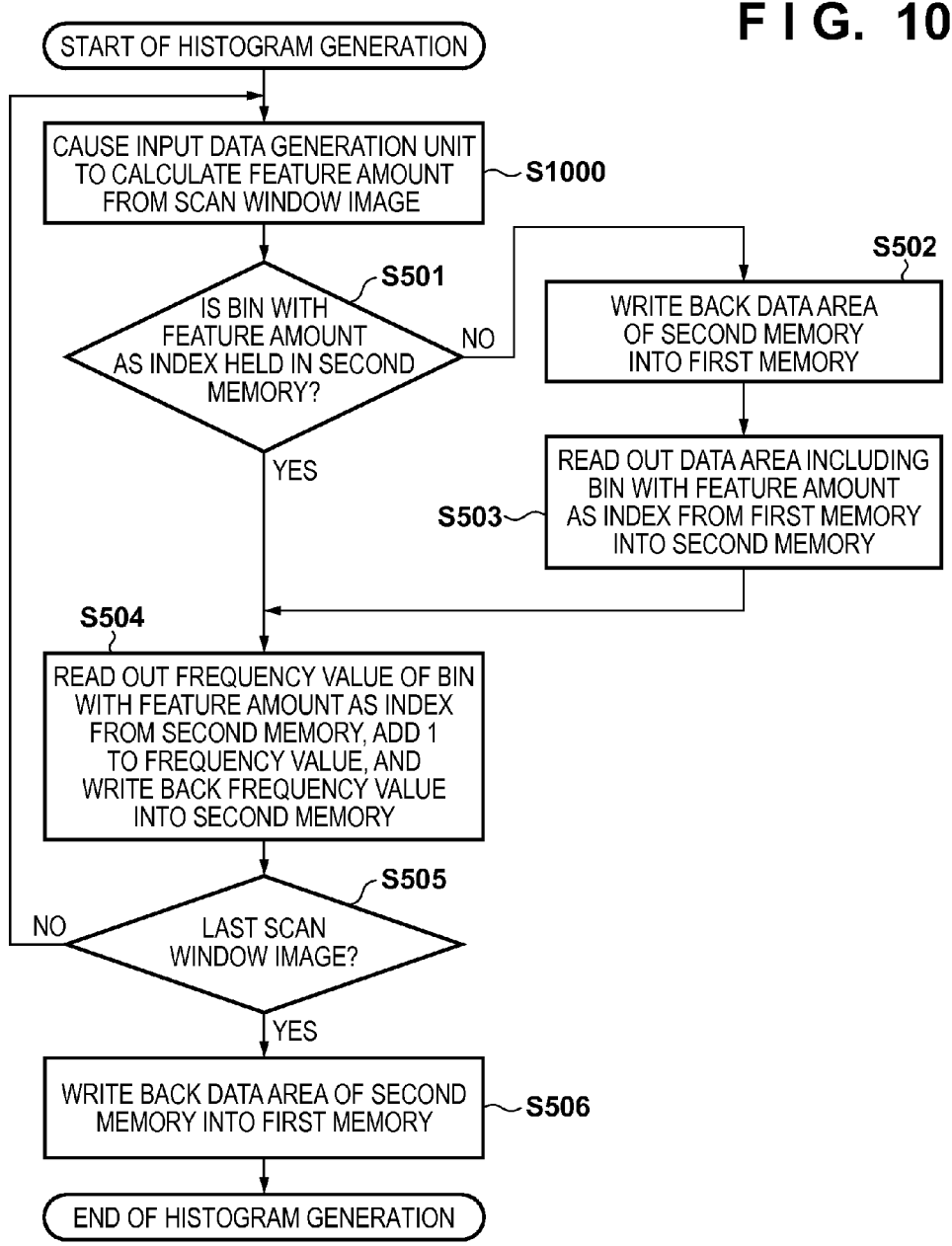
FIG. 10 is a flowchart illustrating processing executed by a histogram generation unit 103 when the second mode is set.

Processing executed by the histogram generation unit 103 when the second mode is set will be described with reference to FIG. 10 which is a flowchart illustrating the processing. Note that the same step numbers as in FIG. 5 denote the same processing steps in FIG. 10 and a description thereof will be omitted.

<Step S1000>

The scan window processing unit 102 arranges a window at the pixel position (x, y) (initial values are x=2 and y=2) on the face image extracted from the inspection image. Since the scan window processing unit 102 sends the pixel values of the respective pixels of the window to the input data generation unit 104, the input data generation unit 104 generates a bit string representing the magnitude relationships between the pixel value at the central pixel position of the window and the pixel values at the peripheral pixel positions of the central pixel position. Similarly to step S705 above, the input data generation unit 104 reconstructs the bit string by rearranging bits forming the generated bit string using the "selection order" notified of from the rearrangement processing unit 106 in step S707 above. The input data generation unit 104 transforms the reconstructed bit string using the "transforming method" notified of from the rearrangement processing unit 106 in step S707 above (inverts bit values at bit positions indicated by the transforming method). The input data generation unit 104 calculates a corresponding LBP as a feature amount using the bit string obtained by the above processes, and sends the calculated LBP to the histogram calculation unit 105.

Since bins having high frequency values in the first mode are stored in the first cache line, bins predicted to have frequency values also in the second mode are stored in the first cache line. Consequently, desired frequency values are held in the second memory unit 402 in the processing in step S501 at high probability, thereby making it possible to reduce the frequency of access to the low-speed first memory unit 401.

As described above, it is possible to largely reduce the number of accesses to the low-speed memory by holding, in one memory area, bins with high frequency values generated in different memory areas, that is, by processing the bins as continuous data.

Note that the processing of generating a histogram of LBPs has been explained in this embodiment. The present invention, however, is not limited to this, and is applicable to processing of generating a histogram in the edge gradient direction of pixels, which is described in N. Dalal and B. Triggs, "Histograms of Oriented Gradients for Human Detection", IEEE Computer Vision and Pattern Recognition, pp. 886-893, 2005.

In this embodiment, an example of the following technique has been described above. That is, a feature amount for each pixel of an image is received. At this time, if the frequency value of the feature amount is registered in the second memory accessible at higher speed than the first memory, the frequency value is increased. Alternatively, if the frequency value is not registered, contents in the second memory are moved to the first memory, and the frequency value is read out from the first memory into the second memory, and increased. Then, a histogram of the feature amounts of the respective pixels of the image is generated, and the bins of the histogram are rearranged so that bins with relatively high frequency values are close to each other in the histogram.

As a practical example, for each pixel of the image, a bit string representing the magnitude relationships between the pixel value of the pixel and the pixel values of the peripheral pixels of the pixel is generated as a feature amount. For each rearranging order and each bit pattern, the total value of the frequency values of a plurality of kinds of bit strings each of which is transformed into a bit string including the bit pattern by rearranging bit values according to the rearranging order is obtained, and then a combination of the rearranging order and bit pattern which provides a largest total value is identified. For each bit string as a bin of the histogram, the bit values of the bit string are rearranged according to the identified rearranging order to generate a bit string, and the generated bit string is transformed by performing, for the generated bit string, the same transforming processing as that for making the bit values of the identified bit pattern equal to each other. Data sets, each of which corresponds to each transformed bit string and includes the bit string and a frequency value corresponding to the bin as the generation source of the bit string in the histogram, are rearranged in ascending order of the value of the bit string.

Second Embodiment

In the first embodiment, the bins of a histogram are transformed so that bins with high appearance frequencies (bins with high histogram values) are processed as close bins in the histogram. In this embodiment, to achieve the same purpose, an example of a technique of using a table for designating an address using an LBP of an index as a key will be described.

An image processing apparatus according to this embodiment is the same as that (FIG. 1) according to the first embodiment. In this embodiment, processing executed by the image processing apparatus in the first mode is indicated by the flowchart shown in FIG. 5. However, processes in steps S501 to S506 are the same as in the first embodiment, and only processing in step S507 is different from that in the first embodiment. In processing executed by a histogram generation unit 103 in the second mode according to the flowchart shown in FIG. 10, processes in steps S502, S503, S505, and S506 are the same as in the first embodiment, and only processes in steps S1000, S501, and S504 are different from those in the first embodiment. The difference from the first embodiment will be mainly described below. Unless otherwise identified, details are the same as in the first embodiment.

The processing in step S507 according to this embodiment will be described first with reference to FIG. 12 which is a flowchart illustrating the processing.

<Step S1200>

A rearrangement processing unit 106 sorts, in descending order of a frequency value, data sets each of which includes an LBP and frequency value in a histogram generated by a histogram calculation unit 105 and stored in a first memory unit 401, thereby updating the histogram stored in the first memory unit 401.

<Step S1201>

The rearrangement processing unit 106 generates a table in which the data sets in the first memory unit 401 are registered. FIG. 13 shows an example of the generated table. FIG. 13 shows the correspondence between the LBP (represented by a bit string) of a data set and a corresponding address (an address in the first memory unit 401). The "address" is included in the data set, as described above.

<Step S1202>

The rearrangement processing unit 106 registers, in a registered histogram storage unit 107, the histogram stored in the first memory unit 401.

<Step S1203>

The rearrangement processing unit 106 sends the table generated in step S1201 to the histogram calculation unit 105.

Figure 14:
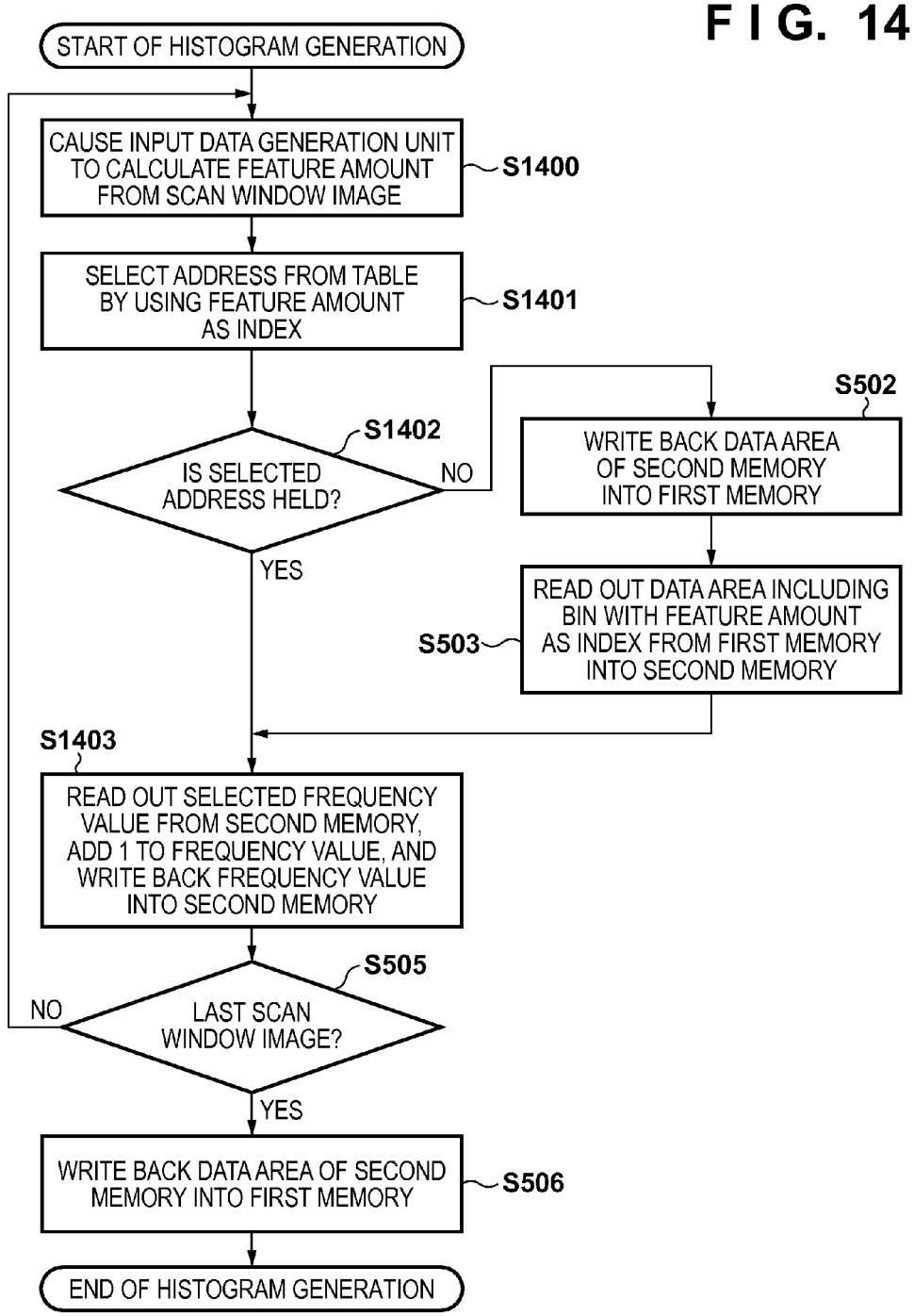
FIG. 14 is a flowchart illustrating processing executed by a histogram generation unit 103 when the second mode is set.

Processing executed by the histogram generation unit 103 in the second mode will be described with reference to FIG. 14 which is a flowchart illustrating the processing.

<Step S1400>

A scan window processing unit 102 arranges a window at a pixel position (x, y) (initial values are x=2 and y=2) on a face image extracted from an inspection image. Since the scan window processing unit 102 sends the pixel values of the respective pixels of the window to an input data generation unit 104, the input data generation unit 104 generates a bit string representing the magnitude relationships between the pixel value at the central pixel position of the window and the pixel values at the peripheral pixel positions of the central pixel position. The input data generation unit 104 calculates a corresponding LBP as a feature amount using the generated bit string, and sends the calculated LBP to the histogram calculation unit 105. The histogram calculation unit 105 receives the LBP.

<Step S1401>

The histogram calculation unit 105 refers to the table received from the rearrangement processing unit 106, and acquires, from the table, an address corresponding to the LBP received from the input data generation unit 104.

<Step S1402>

The histogram calculation unit 105 determines whether a data set including the address acquired from the table in step S1401 is stored in a second memory unit 402. If it is determined that the data set is stored, the process advances to step S1403; otherwise, the process advances to step S502.

<Step S1403>

The histogram calculation unit 105 adds 1 to a frequency value (in the same data set as that of the address) corresponding to the address corresponding to the LBP received from the input data generation unit 104, thereby updating the frequency value.

As described above, the arrangement of the bins of the histogram acquired from the inspection image is changed to conform to the arrangement (the respective bins are arranged in descending order of the frequency value) of the bins of the histogram stored in the registered histogram storage unit 107. Another method may be used as long as the same purpose can be achieved.

[Third Embodiment]

In this embodiment, a case in which the technique according to the second embodiment is implemented using a multicore processor will be described. The essence of the following description is not limited to a case in which the number of cores is two, as a matter of course. The number of cores may be three or more.

Figure 15:
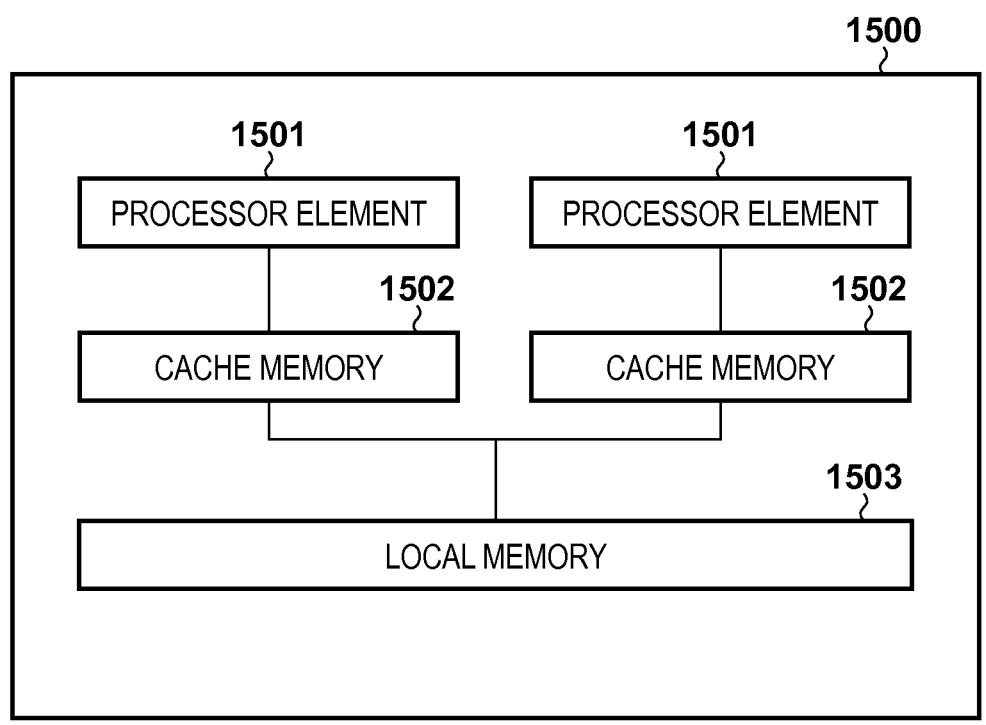
FIG. 15 is a block diagram showing an example of the arrangement of a multicore processor.

FIG. 15 shows an example of the arrangement of a multicore processor applicable to this embodiment. In this embodiment, assume that a histogram calculation unit 105 has the arrangement shown in FIG. 15. A processor 1500 such as a GPU or CPU exemplified in FIG. 15 includes two processor elements 1501 for executing calculation processing, two cache memories 1502, and a local memory 1503. Each of the cache memories 1502 is accessible from only one corresponding processor element. In FIG. 15, only the left processor element 1501 can access the left cache memory 1502, and only the right processor element 1501 can access the right cache memory 1502. Each of the cache memories 1502 and the local memory 1503 are examples of the second memory unit 402 and first memory unit 401 shown in FIG. 4, respectively. Similarly to the first and second embodiments, therefore, each of the cache memories 1502 performs data transfer with the local memory 1503 for each cache line, that is, for a given memory area. Each of the cache memories 1502 holds address information on the local memory 1503 as a tag.

Figure 5:
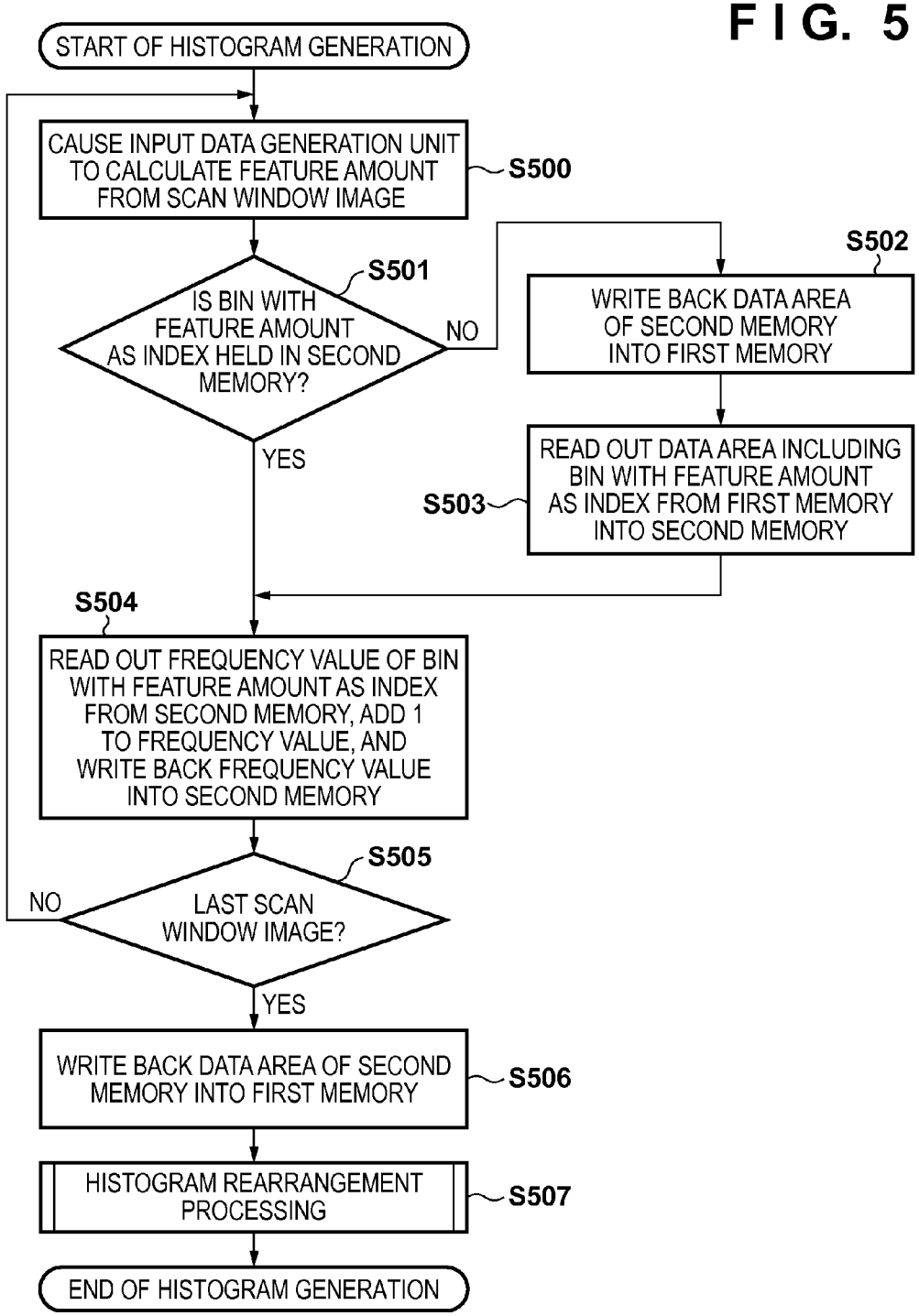
FIG. 5 is a flowchart illustrating processing executed by the image processing apparatus when the first mode is set.

Processing executed by an image processing apparatus in the first mode according to this embodiment is indicated by the flowchart shown in FIG. 5. Processes in steps S501 to S506 are the same as in the first embodiment, and only processing in step S507 is different from that in the first embodiment. In processing executed by a histogram generation unit 103 in the second mode according to the flowchart shown in FIG. 10, processes in steps S502, S503, S505, and S506 are the same as in the first embodiment, and only processes in steps S1000, S501, and S504 are different from those in the first embodiment. The difference from the first embodiment will be mainly described below. Unless otherwise identified, details are the same as in the first embodiment.

Figure 16:
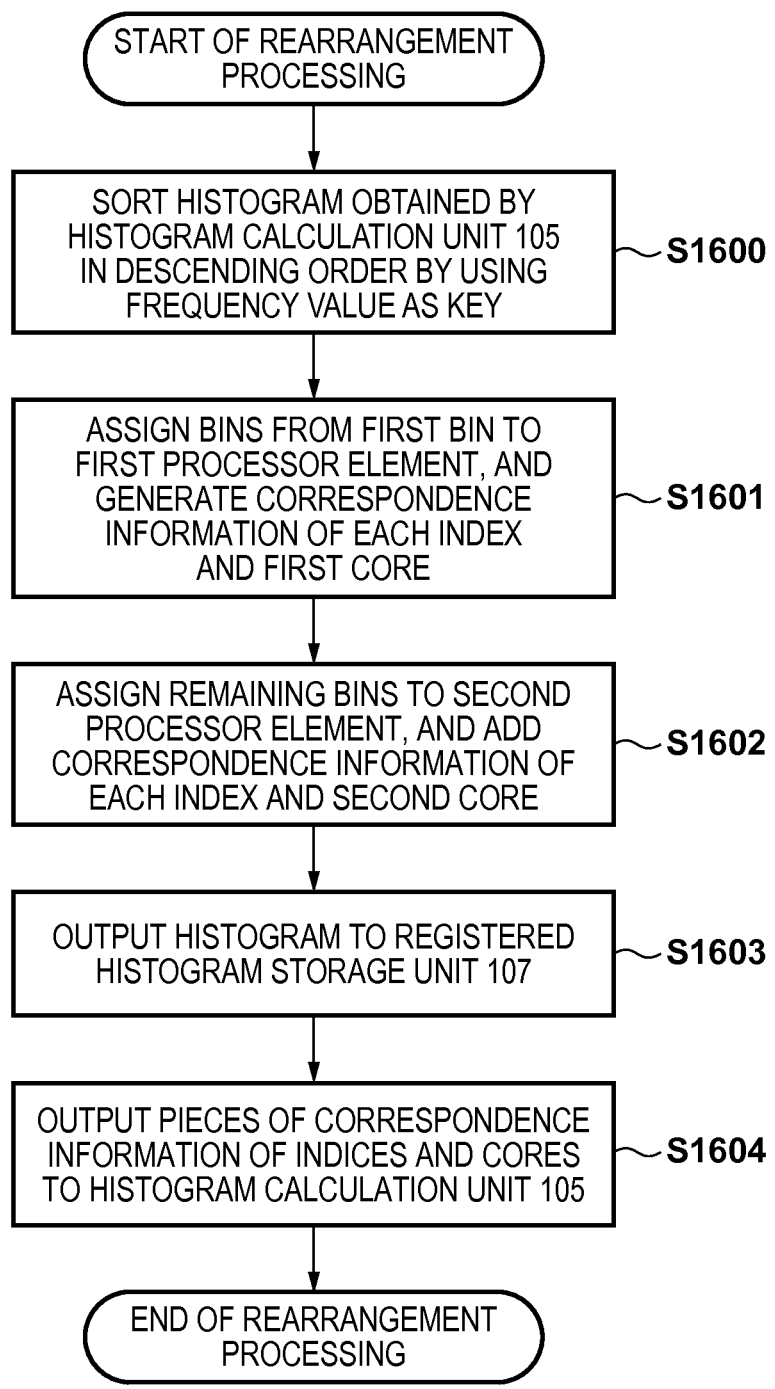
FIG. 16 is a flowchart illustrating details of processing in step S507.

The processing in step S507 according to this embodiment will be described first with reference to FIG. 16 which is a flowchart illustrating the processing.

<Step S1600>

A rearrangement processing unit 106 sorts, in descending order of a frequency value, data sets each including an LBP and frequency value in a histogram generated by the histogram calculation unit 105 and stored in a first memory unit 401, thereby updating the histogram stored in the first memory unit 401. Note that the histogram calculation unit 105 may generate a histogram using the two processor elements or only one of them.

<Step S1601>

The rearrangement processing unit 106 decides bins to be assigned to one of the processor elements 1501 among the bins of the histogram updated in step S1600 from the first bin (for example, the top row in FIG. 13) to the last bin (for example, the bottom row), and registers, in a table (correspondence information) in association with each other, information indicating each decided bin, the address of the decided bin in the local memory 1503, and information indicating the processor element 1501 (as an example, the core number of the processor element 1501).

Note that one of the processor elements 1501 is assigned with the number of bins which can be held in the cache memory 1502 corresponding to the processor element 1501. Assume, for example, that a memory capacity necessary for one bin is 4 bytes as in the first and second embodiments. In this case, if the cache memory size is 32 bytes, a memory area for tags is required and thus the one processor element 1501 processes seven bins.

<Step S1602>

The rearrangement processing unit 106 registers, in the table (correspondence information) in association with each other, information indicating each of the remaining bins which have not been assigned to the above processor element 1501 among the bins of the histogram updated in step S1600, the address of the remaining bin in the local memory 1503, and information indicating the other processor element 1501 (as an example, the core number of the other processor element 1501).

<Step S1603>

The rearrangement processing unit 106 registers, in a registered histogram storage unit 107, the histogram stored in the first memory unit 401.

<Step S1604>

The rearrangement processing unit 106 sends the tables (pieces of correspondence information) generated in steps S1601 and S1602 to the histogram calculation unit 105.

Figure 17:
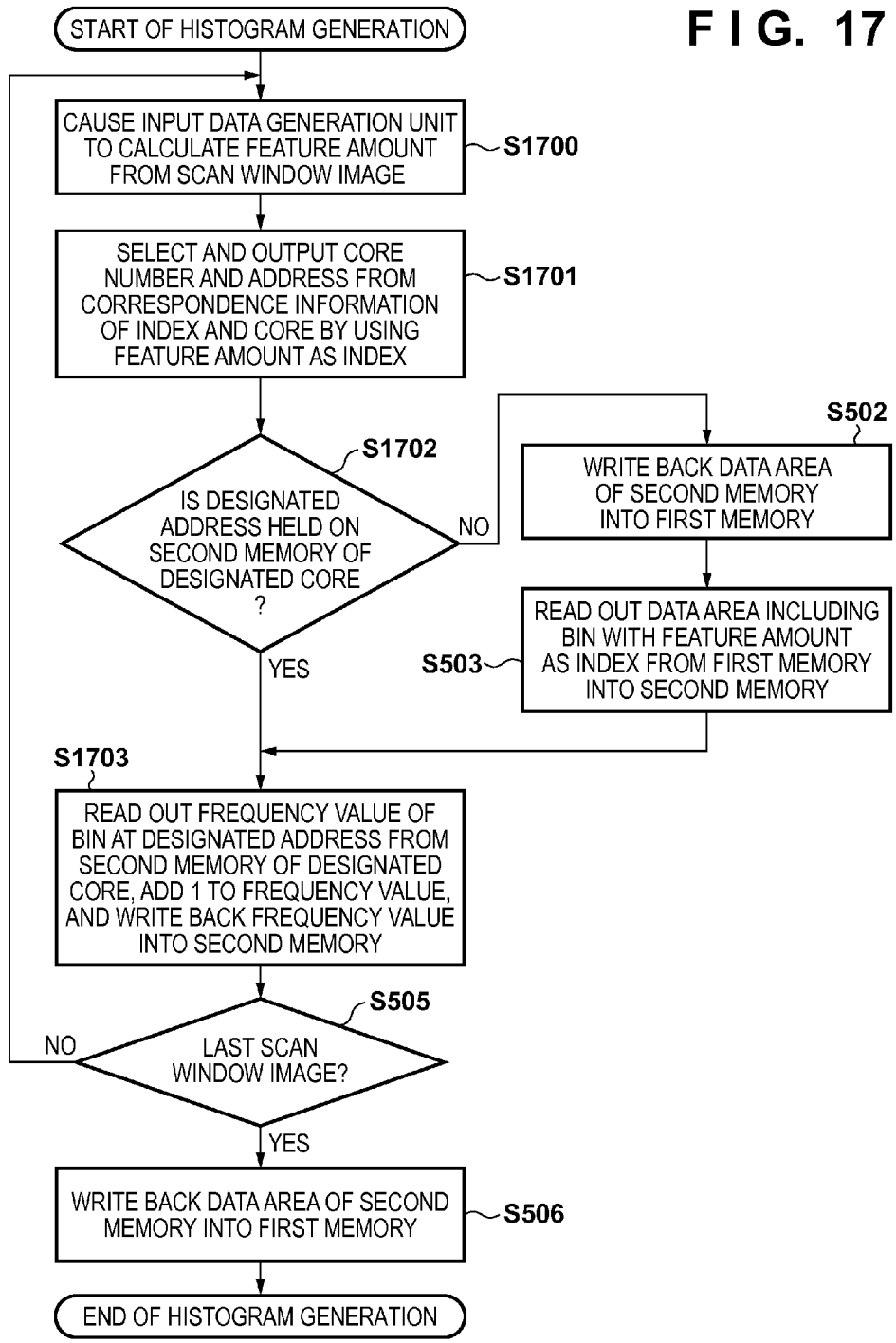
FIG. 17 is a flowchart illustrating processing executed by a histogram generation unit 103 when the second mode is set.

Processing executed by the histogram generation unit 103 in the second mode will be described with reference to FIG. 17 which is a flowchart illustrating the processing.

<Step S1700>

A scan window processing unit 102 arranges a window at a pixel position (x, y) (initial values are x=2 and y=2) on a face image extracted from an inspection image. Since the scan window processing unit 102 sends the pixel values of the respective pixels of the window to an input data generation unit 104, the input data generation unit 104 generates a bit string representing the magnitude relationships between the pixel value at the central pixel position of the window and the pixel values at the peripheral pixel positions of the central pixel position. The input data generation unit 104 calculates a corresponding LBP as a feature amount using the generated bit string, and sends the calculated LBP to the histogram calculation unit 105. The two processor elements 1501 of the histogram calculation unit 105 receive the LBP.

<Step S1701>

One of the processor elements 1501 determines whether information indicating the LBP received from the input data generation unit 104 is registered in the table generated in step S1601 as information indicating a bin. On the other hand, the other processor element 1501 determines whether the information indicating the LBP received from the input data generation unit 104 is registered in the table generated in step S1602 as information indicating a bin.

With the determination processes by the processor elements 1501, it is possible to determine whether the information indicating the LBP received from the input data generation unit 104 is registered in the table generated in step S1601 or the table generated in step S1602.

If the information indicating the LBP received from the input data generation unit 104 is registered in the table generated in step S1601, one of the processor elements 1501 acquires an address and core number corresponding to the LBP from the table. On the other hand, if the information indicating the LBP received from the input data generation unit 104 is registered in the table generated in step S1602, the other processor element 1501 acquires an address and core number corresponding to the LBP from the table.

Among the processor elements 1501, a processor element which has acquired the corresponding address and core number will be referred to as the processor element 1501 of interest hereinafter.

<Step S1702>

The processor element 1501 of interest determines whether a data set including the address acquired from the table in step S1701 is stored in the cache memory 1502 (the cache memory 1502 corresponding to the processor element 1501 of interest) corresponding to the core number acquired from the table in step S1701. If it is determined that the data set is stored, the process advances to step S1703; otherwise, the process advances to step S502.

Note that in steps S502 and S503, the cache memory 1502 corresponding to the core number acquired from the table in step S1701 is used as the second memory unit 402.

<Step S1703>

The processor element 1501 of interest adds 1 to a frequency value (in the same data set as that of the address) corresponding to the address corresponding to the LBP received from the input data generation unit 104, thereby updating the frequency value.

As described above, according to this embodiment, in a histogram to be calculated, the first processor element processes bins with higher frequencies and the second processor element processes the remaining bins with lower frequencies. When attention is paid to the first processor element, for a bin with a large memory access count, that is, a high frequency value, only one reading operation and one writing operation are performed in data transfer between the cache memory and the local memory, and the processes in steps S502 and S503 are not performed. When attention is paid to the second processor element, data transfer between the cache memory and the local memory is performed but the frequency of access to a bin is low, thereby hardly exerting an influence. According to this embodiment, therefore, it is possible to reduce the number of accesses to a low-speed memory, thereby shortening the access time.

There are various methods of assigning bins to each processor element 1501 when the number of cores is three or more, and the present invention is not limited to a specific method.

[Fourth Embodiment]

In the first embodiment, in the processes in steps S700 to S702, for each of the bit strings "000000" to "111111" of 6 bits, the total value of frequency values for four bit strings of 8 bits, each of which includes the bit string of 6 bits as upper bits and lower bits "00", "01, "10" or "11", is obtained.

In this embodiment, a bin with a highest frequency is always included in the first cache line. To do this, in this embodiment, in steps S700 to S702, the bit string (largest frequency value bit string) of a bin corresponding to the largest frequency value in a histogram is used instead of the bit strings 00000000 to 11111111. More specifically, upper six bits are extracted from the largest frequency value bit string. The total value of frequency values for bit strings of 8 bits, each of which includes the extracted 6 bits as upper bits and lower bits "00", "01", "10", or "11", is calculated for all selection orders of P0 to P7. In step S703, a "selection order" used to calculate a largest total value and the bit string of 6 bits are registered in a memory (not shown).

That is, for each pixel of an image, a bit string representing the magnitude relationships between the pixel value of the pixel and the pixel values of the peripheral pixels of the pixel is generated as a feature amount. A bit pattern of the bit string corresponding to a largest frequency value in the histogram is set as a target bit pattern. For each rearranging order, the total value of the frequency values of a plurality of kinds of bit strings each of which is transformed into a bit string including the target bit pattern by rearranging bit values according to the rearranging order is obtained. Then, the rearranging order which provides a largest total value is identified. For each bit string as a bin of the histogram, the bit values of the bit string are rearranged according to the identified rearranging order to generate a bit string, and the generated bit string is transformed by performing, for the generated bit string, the same transforming processing as that for making the bit values of the target bit pattern equal to each other. Data sets, each of which corresponds to each transformed bit string and includes the bit string and a frequency value corresponding to the bin as the generation source of the bit string in the histogram, are rearranged in ascending order of the value of the bit string.

In the second embodiment, the data sets are sorted using the frequency value as a key in step S1200. However, addresses may be sequentially assigned from a bin exceeding a threshold in the histogram.

Figure 1:
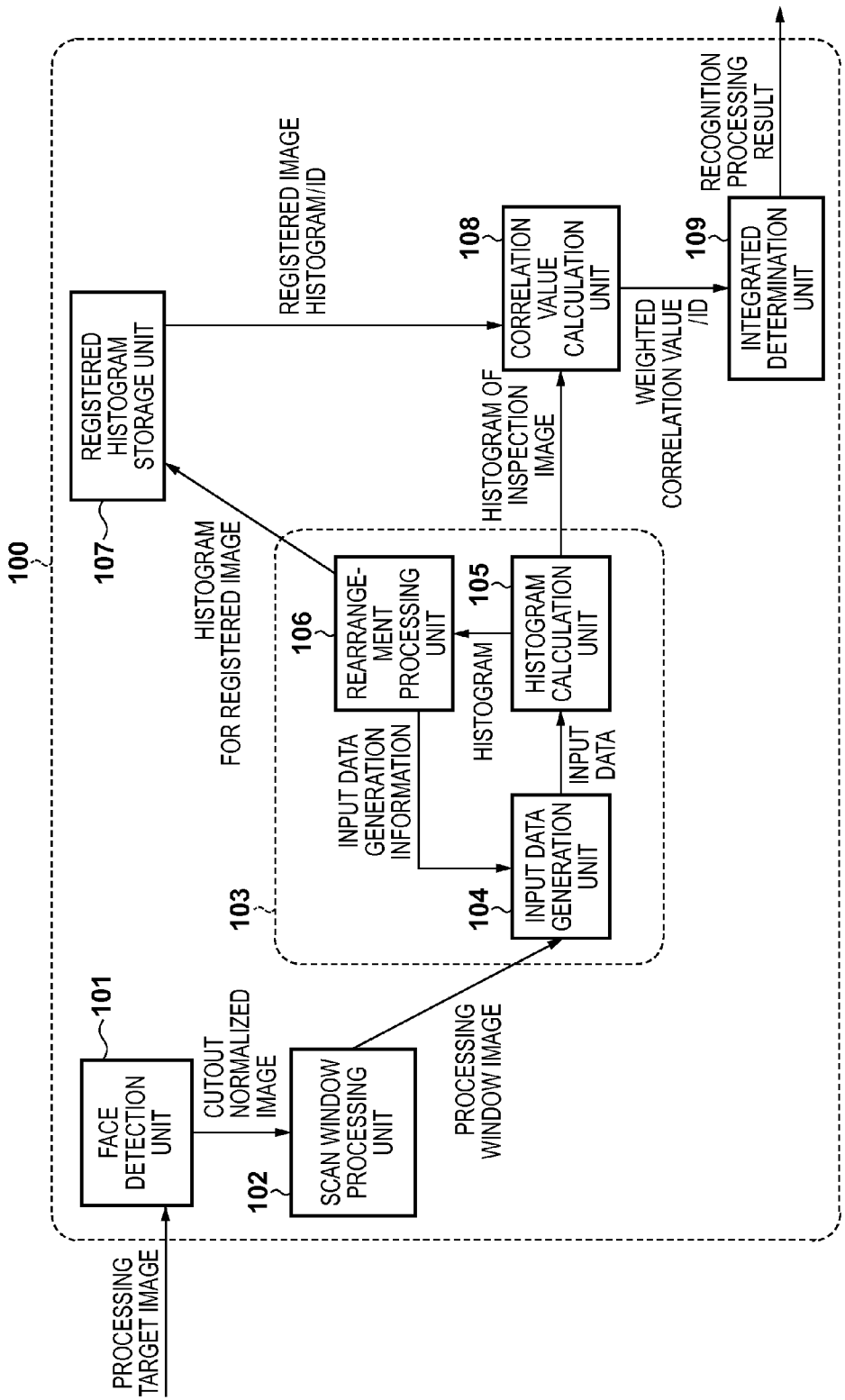
FIG. 1 is a block diagram showing an example of the functional arrangement of an image processing apparatus.

All the functional units shown in FIG. 1 may be implemented by hardware. However, the functional unit serving as a memory may be implemented by a hard disk or RAM and the remaining functional units may be implemented by software (computer program). In this case, the aforementioned image processing apparatus is applicable to any computer including the hard disk or RAM and a processor capable of executing the computer program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-077247, filed Apr. 3, 2014, which is hereby incorporated by reference herein in its entirety.

What is claimed is:

1. An image processing apparatus comprising:
   a first memory configured to store frequency values of respective feature amounts;
   a second memory configured to store some of the frequency values stored in the first memory, wherein the second memory has smaller capacity than the first memory and is accessible at higher speed than the first memory;
   a program memory; and a processor in communication with the program memory
to function as:
a generation unit configured to generate a histogram of feature amounts of respective pixels of an image by receiving the feature amount of each pixel of the image and, if a frequency value of the feature amount is registered in the second memory, increasing the frequency value in the second memory, and, if the frequency value is not registered in the second memory, reading out the frequency value from the first memory into the second memory, and increasing the frequency value in the second memory; and
a regeneration unit configured to regenerate the histogram by arranging bins of the histogram in the first memory so that bins with high frequency values are read out into a same storage area in the second memory,
wherein the regeneration unit includes:
a selection unit configured to obtain, for each bit pattern of bit patterns with a predetermined length, a total value of frequency values for a plurality of bit strings, each of which includes the bit pattern in a predetermined portion, and select one of the bit patterns based on respective total values for the bit patterns;
a transforming unit configured to generate, for each bit string as a bin of the histogram, a bit string by rearranging bit values of the bit string, and transform the generated bit string by performing, for the generated bit string, the same transforming processing as that for making the bit values of the bit pattern selected by the selection unit equal to each other; and
a sorting unit configured to sort, in ascending order of a value of the bit string, data sets each of which corresponds to each of the bit strings transformed by the transforming unit and includes the bit string and a frequency value corresponding to the bin as a generation source of the bit string in the histogram.

2. The apparatus according to claim 1, wherein the generation unit generates, for each pixel of the image, as the feature amount, a bit string representing magnitude relationships between a pixel value of the pixel and pixel values of peripheral pixels of the pixel.

3. The apparatus according to claim 1, wherein the regeneration unit arranges the bins of the histogram in descending order of the frequency value.

4. An image processing apparatus comprising:
a first memory configured to store frequency values of respective feature amounts;
a second memory configured to store some of the frequency values stored in the first memory, wherein the second memory has smaller capacity than the first memory and is accessible at a higher speed than the first memory;
a program memory; and
a processor in communication with the program memory
to function as:
a generation unit configured to generate a histogram of feature amounts of respective pixels of an image by receiving the feature amount of each pixel of the image and, if a frequency value of the feature amount is registered in the second memory, increasing the frequency value in the second memory, and, if the frequency value is not registered in the second memory, reading out the frequency value from the first memory into the second memory, and increasing the frequency value in the second memory; and
a regeneration unit configured to regenerate the histogram by arranging bins of the histogram in the first memory so that bins with high frequency values are read out into a same storage area in the second memory,
wherein the regeneration unit includes:
an identifying unit configured to set, as a target bit pattern, a bit pattern of a bit string corresponding to a largest frequency value in the histogram, obtain, for each rearranging order, a total value of frequency values of a plurality of kinds of bit strings, each of which is transformed into a bit string including the target bit pattern by rearranging bit values according to the rearranging order, and identify the rearranging order which provides a largest total value;
a transforming unit configured to generate, for each bit string as a bin of the histogram, a bit string by rearranging the bit values of the bit string according to the rearranging order identified by the identifying unit, and transform the generated bit string by performing, for the generated bit string, the same transforming processing as that for making the bit values of the target bit pattern equal to each other; and
a sorting unit configured to sort, in ascending order of a value of the bit string, data sets each of which corresponds to each of the bit strings transformed by the transforming unit and includes the bit string and a frequency value corresponding to the bin as a generation source of the bit string in the histogram.

5. The apparatus according to claim 1, wherein the processor is in communication with the program memory to further function as:
a unit configured to perform recognition processing for another image different from the image using the histogram generated by the regeneration unit and a histogram generated by the generation unit and the regeneration unit for the another image.

6. The apparatus according to claim 1, wherein the generation unit moves contents in the second memory to the first memory in advance of reading out the frequency value from the first memory into the second memory, if the frequency value is not registered in the second memory.

7. An image processing method for an image processing apparatus, which comprises a first memory configured to store frequency values of respective feature amounts, and a second memory configured to store some of frequency values stored in the first memory, the second memory having smaller capacity than the first memory and is accessible at higher speed than the first memory, the method comprising:
generating a histogram of feature amounts of respective pixels of an image by receiving the feature amount of each pixel of the image and, if a frequency value of the feature amount is registered in the second memory, increasing the frequency value in the second memory, and, if the frequency value is not registered in the second memory, reading out the frequency value from the first memory into the second memory, and increasing the frequency value in the second memory; and
regenerating the histogram by arranging bins of the histogram in the first memory so that bins with high frequency values are read out into a same storage area in the second memory
wherein regenerating the histogram includes:
obtaining, for each bit pattern of bit patterns with a predetermined length, a total value of frequency values for a plurality of bit strings each of which including that bit pattern in a predetermined portion;

selecting one of the bit patterns based on respective total values for the bit patterns;

generating, for each bit string as a bin of the histogram, a bit string by rearranging bit values of the bit string;

transforming the generated bit string by performing, for the generated bit string, the same transforming processing as that for making the bit values of the selected bit pattern equal to each other; and sorting, in ascending order of a value of the bit string, data sets each of which corresponds to each of the transformed bit strings and includes the bit string and a frequency value corresponding to the bin as a generation source of the bit string in the histogram.

8. A non-transitory computer-readable storage medium storing a computer program for causing a computer having a first memory configured to store frequency values of respective feature amounts and a second memory configured to store some of the frequency values stored in the first memory, the second memory having smaller capacity than the first memory and being accessible at higher speed than the first memory to function as:

a generation unit configured to generate a histogram of feature amounts of respective pixels of an image by receiving the feature amount of each pixel of the image and, if a frequency value of the feature amount is registered in the second memory, increasing the frequency value in the second memory, and, if the frequency value is not registered in the second memory, reading out the frequency value from the first memory into the second memory, and increasing the frequency value in the second memory; and a regeneration unit configured to regenerate the histogram by arranging bins of the histogram in the first memory so that bins with high frequency values are read out into a same storage area in the second memory, wherein the regeneration unit includes:

a selection unit configured to obtain, for each bit pattern of bit patterns with a predetermined length, a total value of frequency values for a plurality of bit strings each of which including that bit pattern in a predetermined portion, and select one of the bit patterns based on respective total values for the bit patterns, a transforming unit configured to generate, for each bit string as a bin of the histogram, a bit string by rearranging bit values of the bit string, and transform the generated bit string by performing, for the generated bit string, the same transforming processing as that for making the bit values of the bit pattern selected by the selection unit equal to each other, and a sorting unit configured to sort, in ascending order of a value of the bit string, data sets each of which corresponds to each of the bit strings transformed by the transforming unit and includes the bit string and a frequency value corresponding to the bin as a generation source of the bit string in the histogram.

9. An image processing method for an image processing apparatus, which comprises a first memory configured to store frequency values of respective feature amounts, and a second memory configured to store some of frequency values stored in the first memory, the second memory having smaller capacity than the first memory and is accessible at a higher speed than the first memory, the method comprising:

generating a histogram of feature amounts of respective pixels of an image by receiving the feature amount of each pixel of the image and, if a frequency value of the feature amount is registered in the second memory, increasing the frequency value in the second memory, and, if the frequency value is not registered in the second memory, reading out the frequency value from the first memory into the second memory, and increasing the frequency value in the second memory; and regenerating the histogram by arranging bins of the histogram in the first memory so that bins with high frequency values are read out into a same storage area in the second memory, wherein regenerating the histogram includes:

setting, as a target bit pattern, a bit pattern of a bit string corresponding to a largest frequency value in the histogram;

obtaining, for each rearranging order, a total value of frequency values of a plurality of kinds of bit strings, each of which is transformed into a bit string including the target bit pattern by rearranging bit values according to the rearranging order;

identifying the rearranging order which provides a largest total value;

generating, for each bit string as a bin of the histogram, a bit string by rearranging the bit values of the bit string according to the identified rearranging order;

transforming the generated bit string by performing, for the generated bit string, the same transforming processing as that for making the bit values of the target bit pattern equal to each other; and sorting, in ascending order of a value of the bit string, data sets each of which corresponds to each of the transformed bit strings and includes the bit string and a frequency value corresponding to the bin as a generation source of the bit string in the histogram.

10. A non-transitory computer-readable storage medium storing a computer program for causing a computer having a first memory configured to store frequency values of respective feature amounts and a second memory configured to store some of frequency values stored in the first memory, the second memory having smaller capacity than the first memory and being accessible at a higher speed than the first memory to function as:

a generation unit configured to generate a histogram of feature amounts of respective pixels of an image by receiving the feature amount of each pixel of the image and, if a frequency value of the feature amount is registered in the second memory, increasing the frequency value in the second memory, and, if the frequency value is not registered in the second memory, reading out the frequency value from the first memory into the second memory, and increasing the frequency value in the second memory; and a regeneration unit configured to regenerate the histogram by arranging bins of the histogram in the first memory so that bins with high frequency values are read out into a same storage area in the second memory, wherein the regeneration unit includes:

an identifying unit configured to set, as a target bit pattern, a bit pattern of a bit string corresponding to a largest frequency value in the histogram, obtain, for each rearranging order, a total value of frequency values of a plurality of kinds of bit strings, each of which is transformed into a bit string including the target bit pattern by rearranging bit values according to the rearranging order, and identify the rearranging order which provides a largest total value;

a transforming unit configured to generate, for each bit string as a bin of the histogram, a bit string by rearranging the bit values of the bit string according to the rearranging order identified by the identifying unit, and transform the generated bit string by performing, for the generated bit string, the same transforming processing as that for making the bit values of the target bit pattern equal to each other; and
a sorting unit configured to sort, in ascending order of a value of the bit string, data sets each of which corresponds to each of the bit strings transformed by the transforming unit and includes the bit string and a frequency value corresponding to the bin as a generation source of the bit string in the histogram.

* * * * *